United States Patent
Singhal et al.

(10) Patent No.: US 8,595,225 B1
(45) Date of Patent: Nov. 26, 2013

(54) SYSTEMS AND METHODS FOR CORRELATING DOCUMENT TOPICALITY AND POPULARITY

(75) Inventors: Amit Singhal, Palo Alto, CA (US); Urs Hoelzle, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 229 days.

(21) Appl. No.: 10/953,114

(22) Filed: Sep. 30, 2004

(51) Int. Cl.
*G06F 7/04* (2006.01)

(52) U.S. Cl.
USPC .......................... 707/727; 707/731; 707/771

(58) Field of Classification Search
None
See application file for complete search history.

(56) References Cited

U.S. PATENT DOCUMENTS

| | | | | |
|---|---|---|---|---|
| 4,536,857 A * | 8/1985 | Schoenmakers | ................... | 707/7 |
| 4,833,610 A * | 5/1989 | Zamora et al. | ................... | 707/5 |
| 5,446,891 A * | 8/1995 | Kaplan et al. | ................... | 707/2 |
| 5,642,502 A * | 6/1997 | Driscoll | ................... | 707/5 |
| 5,696,962 A * | 12/1997 | Kupiec | ................... | 707/4 |
| 5,761,665 A * | 6/1998 | Gardner et al. | ................... | 707/100 |
| 5,778,362 A * | 7/1998 | Deerwester | ................... | 707/5 |
| 5,983,221 A * | 11/1999 | Christy | ................... | 707/5 |
| 6,070,157 A * | 5/2000 | Jacobson et al. | ................... | 707/1 |
| 6,070,176 A * | 5/2000 | Downs et al. | ................... | 715/513 |
| 6,125,361 A * | 9/2000 | Chakrabarti et al. | ................... | 707/3 |
| 6,182,072 B1 * | 1/2001 | Leak et al. | ................... | 707/10 |
| 6,236,987 B1 * | 5/2001 | Horowitz et al. | ................... | 707/3 |
| 6,480,837 B1 * | 11/2002 | Dutta | ................... | 707/3 |
| 6,502,091 B1 * | 12/2002 | Chundi et al. | ................... | 707/738 |
| 6,598,054 B2 * | 7/2003 | Schuetze et al. | ................... | 707/103 R |
| 6,647,383 B1 * | 11/2003 | August et al. | ................... | 1/1 |
| 6,714,929 B1 * | 3/2004 | Micaelian et al. | ................... | 707/4 |
| 6,718,324 B2 * | 4/2004 | Edlund et al. | ................... | 707/5 |
| 6,873,982 B1 * | 3/2005 | Bates et al. | ................... | 707/5 |
| 7,213,198 B1 * | 5/2007 | Harik | ................... | 715/234 |
| 7,430,561 B2 * | 9/2008 | Bailey et al. | ................... | 707/101 |
| 7,505,964 B2 * | 3/2009 | Tong et al. | ................... | 707/3 |
| 7,801,889 B2 * | 9/2010 | Kim et al. | ................... | 707/731 |
| 7,836,076 B2 * | 11/2010 | Forman et al. | ................... | 707/771 |
| 7,996,397 B2 * | 8/2011 | Borkovsky et al. | ................... | 707/727 |
| 8,051,066 B2 * | 11/2011 | Prasad et al. | ................... | 707/708 |
| 8,065,299 B2 * | 11/2011 | Curtis et al. | ................... | 707/727 |
| 8,073,867 B2 * | 12/2011 | Chowdhury | ................... | 707/771 |
| 8,117,209 B1 * | 2/2012 | Dean et al. | ................... | 707/748 |
| 8,131,755 B2 * | 3/2012 | Kadayam et al. | ................... | 707/771 |
| 8,156,100 B2 * | 4/2012 | Dean et al. | ................... | 707/706 |
| 8,214,358 B2 * | 7/2012 | Friedl et al. | ................... | 707/727 |
| 8,352,452 B2 * | 1/2013 | Dean et al. | ................... | 707/706 |
| 2003/0130993 A1 * | 7/2003 | Mendelevitch et al. | ................... | 707/3 |
| 2003/0195877 A1 * | 10/2003 | Ford et al. | ................... | 707/3 |
| 2004/0068514 A1 * | 4/2004 | Chundi et al. | ................... | 707/102 |
| 2005/0027699 A1 * | 2/2005 | Awadallah et al. | ................... | 707/3 |
| 2005/0086260 A1 * | 4/2005 | Canright et al. | ................... | 707/104.1 |

(Continued)

OTHER PUBLICATIONS

Sumit Agarwal et al.; U.S. Appl. No. 10/879,521; "Systems and Methods for Inferring Concepts for Assocation With Content"; filed Jun. 30, 2004; 43 pages.

*Primary Examiner* — Ajay Bhatia
*Assistant Examiner* — Hubert Cheung
(74) *Attorney, Agent, or Firm* — Harrity & Harrity, LLP

(57) ABSTRACT

A system receives location identifiers associated with documents visited by one or more users. The system retrieves the documents using the received location identifiers and maps the retrieved documents to one or more topics. The system determines a popularity value associated with the retrieved documents and correlates the popularity value with the one or more topics to determine a per-topic popularity for the retrieved documents.

23 Claims, 10 Drawing Sheets

(56) References Cited

U.S. PATENT DOCUMENTS

| | | | |
|---|---|---|---|
| 2005/0144162 A1* | 6/2005 | Liang | 707/3 |
| 2005/0154723 A1* | 7/2005 | Liang | 707/3 |
| 2005/0198268 A1* | 9/2005 | Chandra | 709/224 |
| 2006/0167864 A1* | 7/2006 | Bailey et al. | 707/3 |
| 2007/0192306 A1* | 8/2007 | Papakonstantinou et al. | 707/5 |
| 2009/0006390 A1* | 1/2009 | Malik | 707/5 |
| 2010/0070448 A1* | 3/2010 | Omoigui | 706/47 |
| 2011/0087658 A1* | 4/2011 | Lunt et al. | 707/727 |
| 2011/0093346 A1* | 4/2011 | Lunt et al. | 705/14.71 |
| 2011/0093460 A1* | 4/2011 | Lunt et al. | 707/727 |
| 2011/0179023 A1* | 7/2011 | Dean et al. | 707/727 |
| 2012/0330945 A1* | 12/2012 | Lunt et al. | 707/727 |

\* cited by examiner

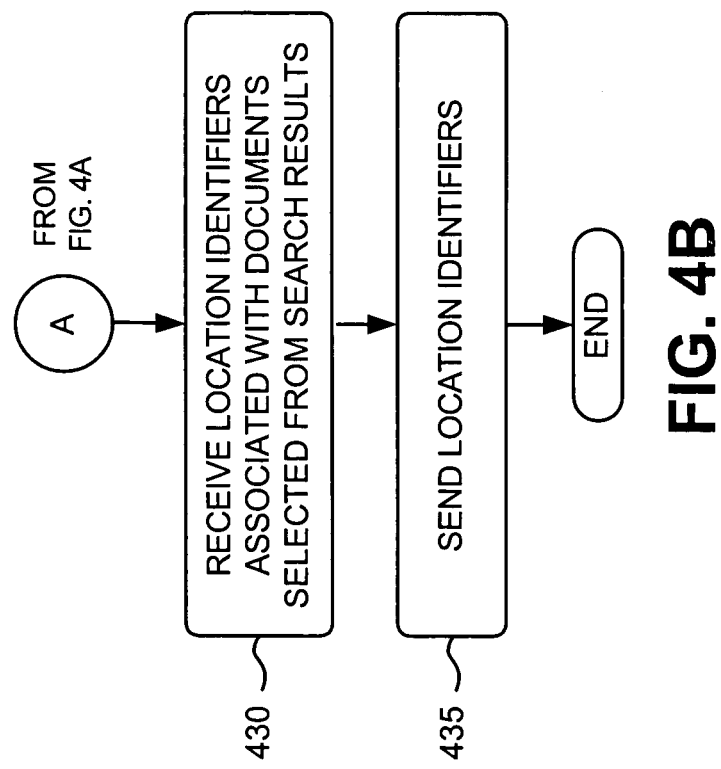

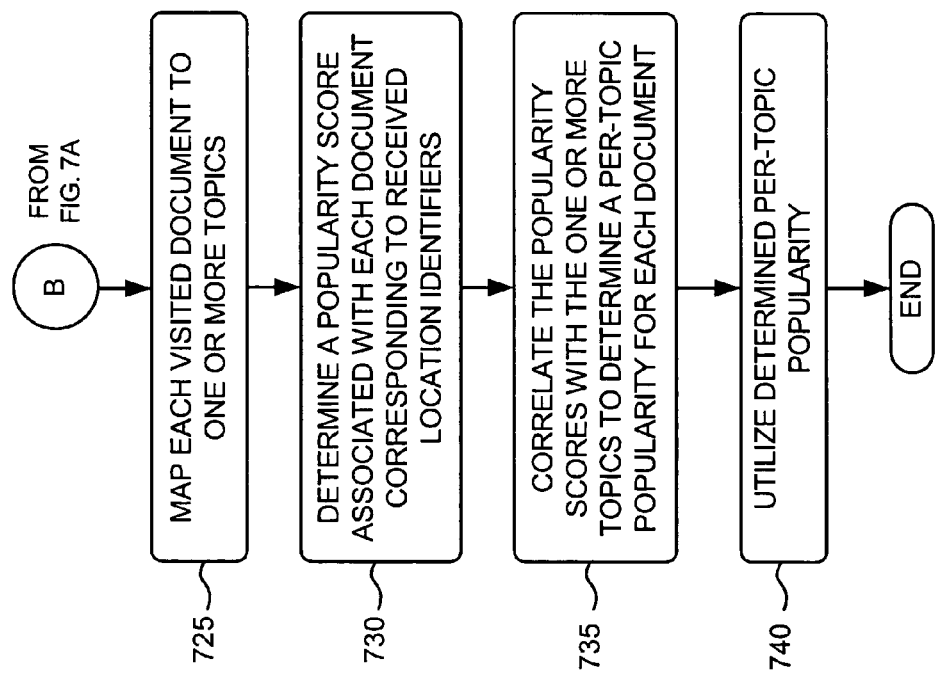

SYSTEMS AND METHODS FOR CORRELATING DOCUMENT TOPICALITY AND POPULARITY

BACKGROUND OF THE INVENTION

1. Field of the Invention

The present invention relates generally to information storage and searching systems and, more particularly, to systems and methods for correlating the topicality and popularity of multiple stored documents.

2. Description of Related Art

Existing information searching systems use search queries to search through aggregated data to retrieve specific information that corresponds to the received search queries. Such information searching systems may search information stored locally, or in distributed locations. The World Wide Web ("web") is one example of information stored in distributed locations. The web contains a vast amount of information and locating a desired portion of that information, however, can be challenging. This problem is compounded because the amount of information on the web, and the number of new users inexperienced at web searching, are growing rapidly.

Search engines attempt to return hyperlinks to web documents in which a user is interested. Generally, search engines base their determination of the user's interest on search terms (called a search query) entered by the user. The goal of the search engine is to provide links to high quality, relevant results to the user based on the search query. Typically, the search engine accomplishes this by matching the terms in the search query to a corpus of pre-stored web documents. Web documents that contain the user's search terms are "hits" and are returned to the user. The search engine oftentimes ranks the documents using a ranking function based on the documents' perceived relevance to the user's search terms.

SUMMARY OF THE INVENTION

According to one aspect consistent with the principles of the invention a method of ranking documents is provided. The method may include determining a popularity score associated with documents of multiple documents. The method may further include determining one or more topics associated the documents of the multiple documents. The method may also include ranking, using the popularity score, the documents within the one or more determined topics.

According to another aspect, a method of correlating topicality and popularity data of multiple documents is provided. The method may include receiving identifiers associated with documents visited by one or more users and retrieving the documents based on the received identifiers. The method may further include mapping the retrieved documents to one or more topics and determining a popularity value associated with the retrieved documents. The method may also include correlating the popularity value with the one or more topics to determine a per-topic popularity for the retrieved documents.

According to a further aspect, a method of ordering documents is provided. The method may include determining a popularity score associated documents of a plurality of documents. The method may further include associating one or more topics with the documents of the plurality of documents. The method may also include using the popularity score associated with the documents to order each document among the one or more topics associated with each document.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 4A and 4B are flowcharts of exemplary client processing according to an implementation consistent with the principles of the invention;

FIGS. 7A and 7B are flowcharts of exemplary server processing according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

A "document," as the term is used herein is to be broadly interpreted to include any machine-readable and machine-storable work product. A document may include an e-mail, a web site, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as JAVASCRIPT, etc.).

EXEMPLARY OVERVIEW

Figure 1:
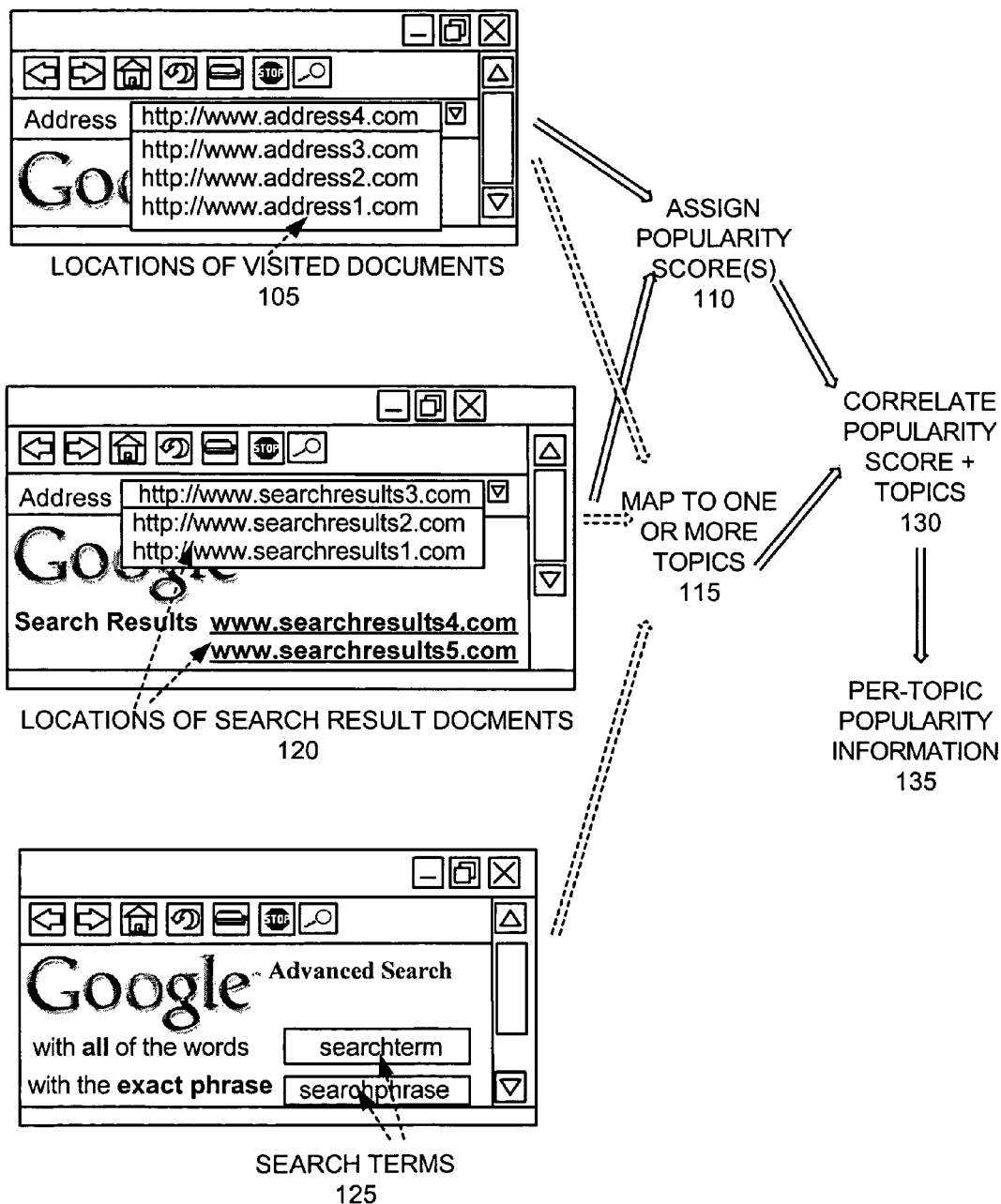
FIG. 1 is a diagram of an overview of an exemplary implementation of the invention.

FIG. 1 illustrates an overview of one exemplary implementation of the invention in which documents of multiple documents are correlated with one another using topicality and popularity data associated with each of the documents to derive per-topic popularity information. Each document of the multiple documents may be assigned a popularity score indicating the popularity of the document relative to other documents of the multiple documents. Each document of the multiple documents may further be mapped to one or more corresponding topics. Each of the documents may be correlated based on the topicality and popularity information associated with each document.

As shown in FIG. 1, documents visited by one or more users, and associated with corresponding document locations 105, may be assigned popularity scores 110 and mapped to one or more topics 115. Additionally, documents received by one or more users as a result of one or more searches, and associated with corresponding document locations 120, may be assigned popularity scores 110 and mapped to one or more topics 115. The popularity scores may be assigned based on a number of different criteria. In one implementation, for example, a popularity score assigned to each document may be based on the number of "visits" or "hits" associated with each document. Thus, a document that has been visited by users more often than another document may have a higher popularity score. Each of the documents may additionally be mapped to one or more topics using various techniques. In one exemplary technique, a directory section in which each document is listed may be used to map a topic to each document. For example, if a document is listed in a travel directory of a search service (e.g., Google), then the document may be mapped to the topic of travel. Other techniques for mapping documents to one or more topics may be used, as described further below.

Furthermore, user-provided search terms 125 may also be mapped to one or more topics 115. Search terms 125 of one or more search queries may be mapped to one or more topics 115 using various techniques, as described further below.

The mapped topic(s) 115 and the assigned popularity score 110 for each document, corresponding to the locations 105 or 120, may be used to correlate 130 all of the documents. The compiled popularity and topic data may be correlated to produce per-topic popularity information 135. For example, document A, corresponding to the location identifier www.address1.com, may be assigned a popularity score of 10 and mapped to TOPIC 1, while document B, corresponding to the location identifier www.address2.com, may be assigned a popularity score of 6 and mapped to TOPIC 2.

Exemplary Network Configuration

Figure 2:
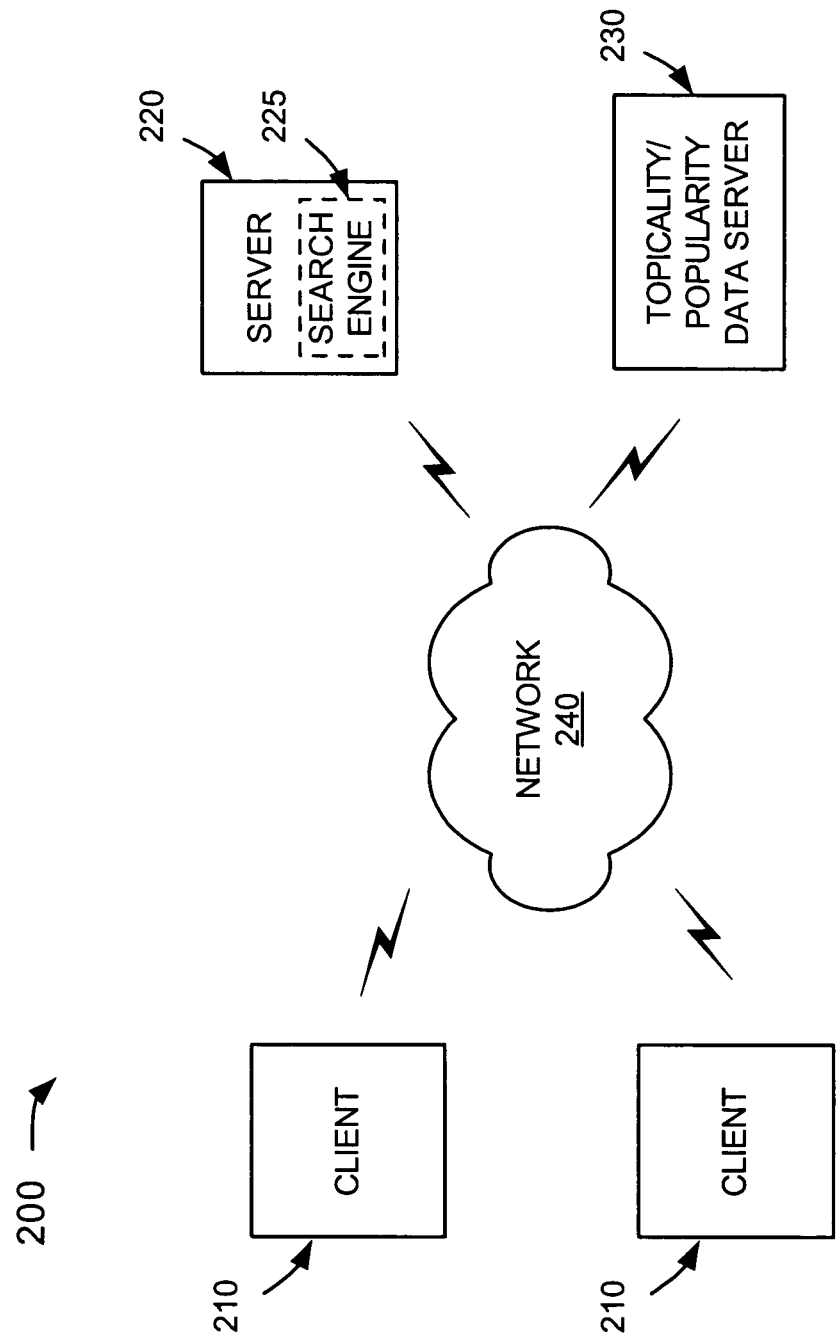
FIG. 2 is a diagram of an exemplary network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220 and 230 via a network 240. Network 240 may include a local area network (LAN), a wide area network (WAN), a telephone network, such as the Public Switched Telephone Network (PSTN), an intranet, the Internet, a memory device, another type of network, or a combination of networks. Two clients 210 and two servers 220 and 230 have been illustrated as connected to network 240 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Servers 220 and 230 may include server entities that gather, process, search, and/or maintain documents in a manner consistent with the principles of the invention. Clients 210 and servers 220 and 230 may connect to network 240 via wired, wireless, and/or optical connections.

In an implementation consistent with the principles of the invention, server 220 may include a search engine 225 usable by users at clients 210. Server 220 may implement a data aggregation service by crawling a corpus of documents (e.g., web pages) hosted on other servers (not shown) and storing information associated with these documents in a repository of crawled documents. The data aggregation service may be implemented in other ways, such as by agreement with the operator(s) of the other servers to distribute their hosted documents via the data aggregation service.

Topicality/popularity data server 230 may accumulate topicality and popularity information related to documents visited by users at clients 210. When a document is visited (i.e., a document is retrieved from a server and displayed at client 210), each client sends a location identifier associated with the visited document to server 230. Additionally, any search query used by client 210 to retrieve the visited document may be sent to server 230. Server 230 may determine one or more topics associated with each visited document. Server 230 may additionally determine a popularity score associated with each visited document. In one implementation, for example, the popularity score may be determined based on a number of times a respective document has been accessed (i.e., visited). Server 230 may correlate the topicality and popularity information for each visited document to determine a per-topic popularity, as further described below.

While servers 220 and 230 are shown as separate entities, it may be possible for one or more of servers 220 and 230 to perform one or more of the functions of another one or more of servers 220 and 230. For example, it may be possible that two or more of servers 220 and 230 are implemented as a single server. It may also be possible for a single one of servers 220 or 230 to be implemented as two or more separate (and possibly distributed) devices.

Exemplary Client/Server Architecture

Figure 3:
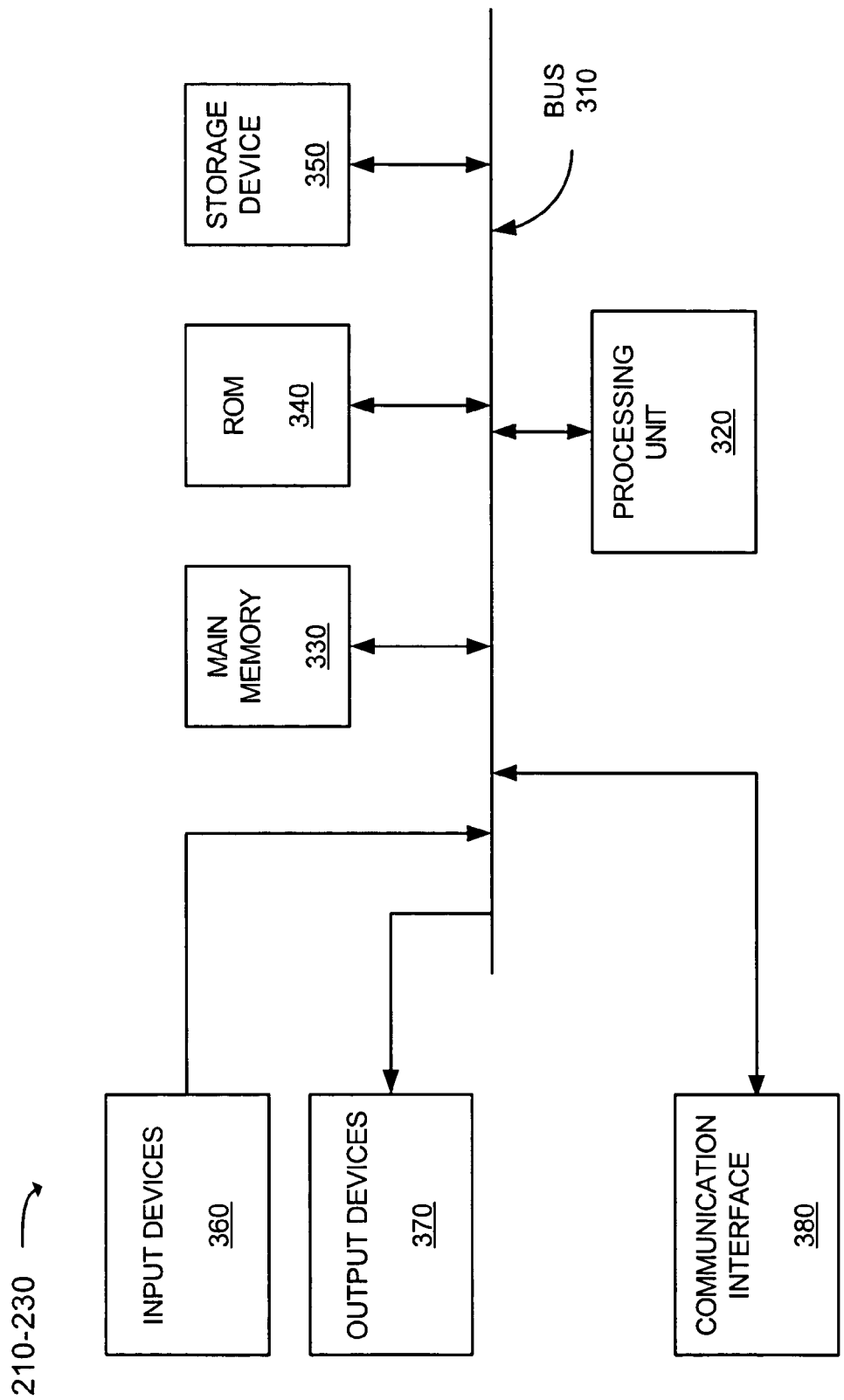
FIG. 3 is an exemplary diagram of a client and/or server of FIG. 2 in an implementation consistent with the principles of the invention.

FIG. 3 is an exemplary diagram of a client or server entity (hereinafter called "client/server entity"), which may correspond to one or more of clients 210 and servers 220 and 230, according to an implementation consistent with the principles of the invention. The client/server entity may include a bus 310, a processing unit 320, an optional main memory 330, a read only memory (ROM) 340, a storage device 350, one or more input devices 360, one or more output devices 370, and a communication interface 380. Bus 310 may include one or more conductors that permit communication among the components of the client/server entity.

Processing unit 320 may include any type of software, firmware or hardware implemented processing device, such as, a microprocessor, a field programmable gate array (FPGA), combinational logic, etc. Main memory 330 may include a random access memory (RAM) or another type of dynamic storage device that stores information and instructions for execution by processing unit 320, if processing unit 320 includes a microprocessor. ROM 340 may include a conventional ROM device or another type of static storage device that stores static information and/or instructions for use by processing unit 320. Storage device 350 may include a magnetic and/or optical recording medium and its corresponding drive.

Input device(s) 360 may include one or more conventional mechanisms that permit an operator to input information to the client/server entity, such as a keyboard, a mouse, a pen, voice recognition and/or biometric mechanisms, etc. Output device(s) 370 may include one or more conventional mechanisms that output information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

As will be described in detail below, the client/server entity, consistent with the principles of the invention, may perform certain searching-related operations. The client/server entity may, in some implementations, perform these operations in response to processing unit 320 executing software instructions contained in a computer-readable medium, such as memory 330. A computer-readable medium may be defined as one or more physical or logical memory devices.

The software instructions may be read into memory 330 from another computer-readable medium, such as data storage device 350, or from another device via communication interface 380. The software instructions contained in memory 330 may cause processing unit 320 to perform processes that will be described later. Alternatively, hardwired circuitry may be used in place of, or in combination with, software instructions to implement processes consistent with the principles of the invention. Thus, implementations consistent with the principles of the invention are not limited to any specific combination of hardware circuitry and software.

Exemplary Client Processing

Figure 4A:
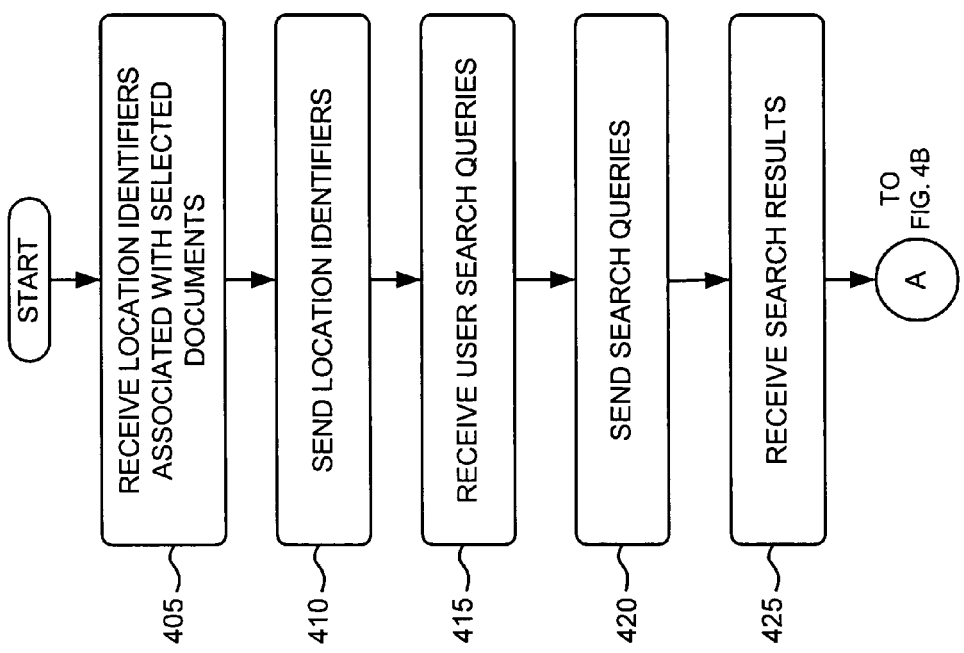

FIGS. 4A and 4B are flowcharts of exemplary client processing according to an implementation consistent with the principles of the invention. As one skilled in the art will appreciate, the processing exemplified by FIGS. 4A and 4B can be implemented in software and stored on a computer-readable memory, such as main memory 330, ROM 340 or storage device 350 of a client 210. In other implementations, the processing exemplified by FIGS. 4A and 4B can be implemented in hardwired circuitry, such as combinational logic, within processing unit 320 of a client 210.

Processing may begin with the receipt of location identifiers associated with documents selected by a user of a client 210 (act 405) (FIG. 4A). A user may provide, via a user interface, document location identifiers to client 210 for the purpose of retrieving those documents from a remote data source, such as a server connected to network 240. In one implementation consistent with principles of the invention, the location identifiers received by client 210 may include uniform resource locators (URLs), such as those used in the world-wide web (WWW). Client 210 may then send the location identifiers to, for example, server 230 (act 410). Client 210 may send the location identifiers via network 240 using existing messaging techniques. In other implementations, client 210 may instead send the location identifiers to server 220 in the case where server 220 correlates the topicality and popularity of documents (as described below with respect to FIGS. 7A and 7B).

Figure 5:
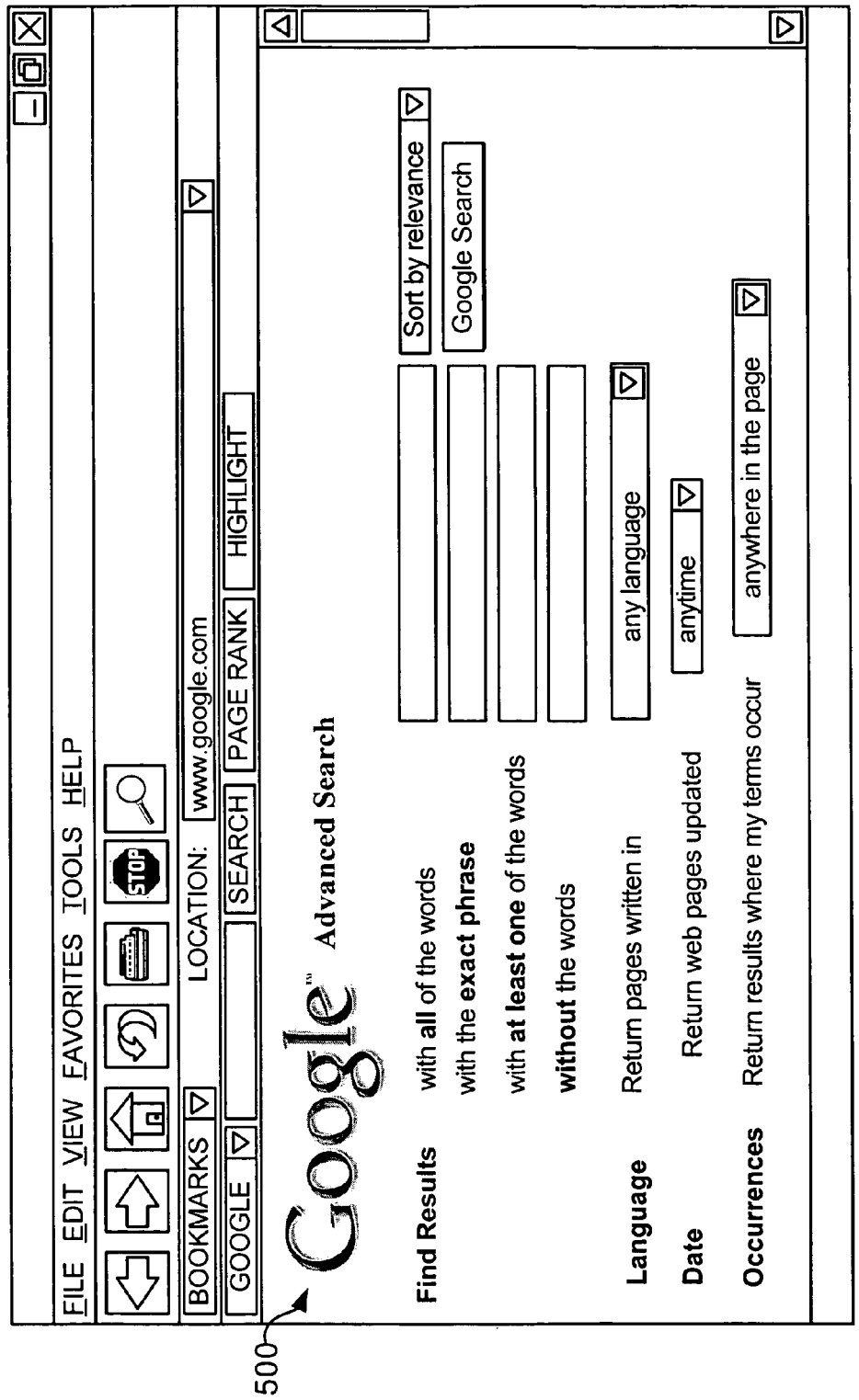
FIG. 5 is a diagram of an exemplary search document according to an implementation consistent with the principles of the invention.

Client 210 may receive one or more search queries (act 415). Client 210 may receive the search queries from a user via an input interface, or may retrieve previously stored search queries from memory. FIG. 5 illustrates one exemplary input interface 500 that permits a user to enter a search query. Client 210 may then send the one or more search queries to, for example, server 220 (act 420) so that server 220 can perform a search of aggregated data using the one or more search queries.

Figure 6:
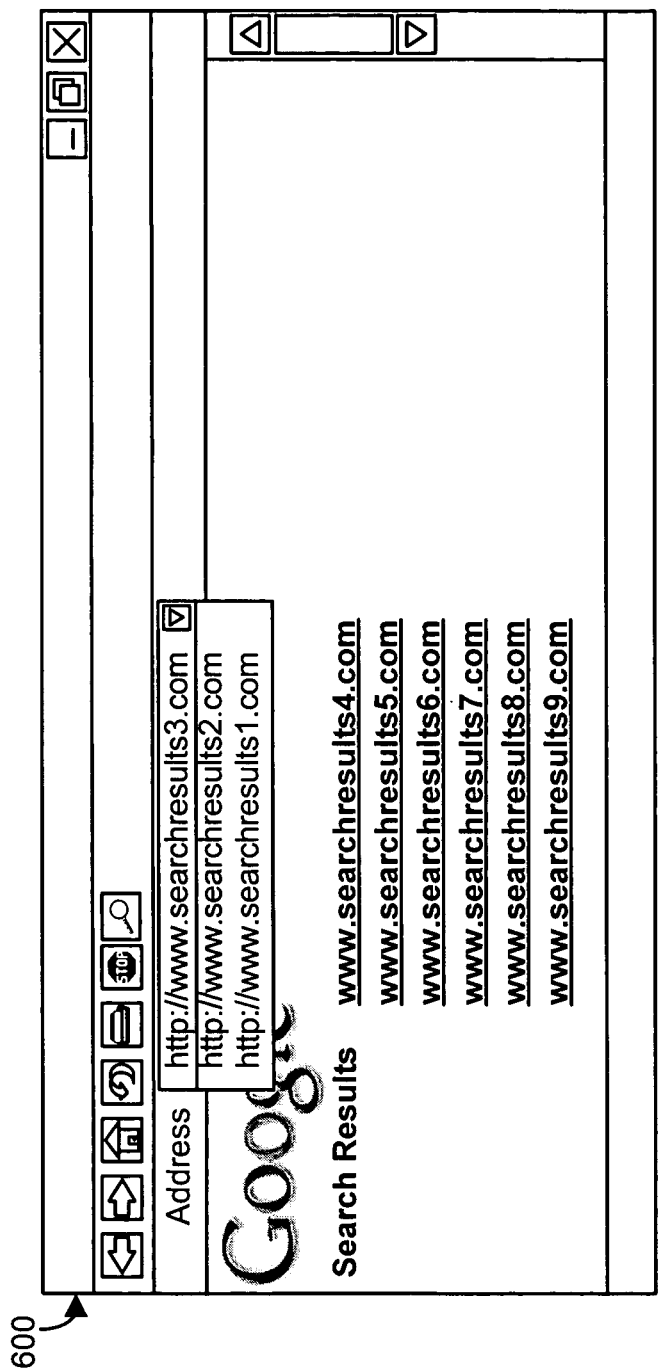
FIG. 6 is a diagram of an exemplary search result document according to an implementation consistent with the principles of the invention.

Client 210 may receive search results from server 220 (act 425). The search results may include a list of identifiers identifying a location of each search result document and, possibly, a portion of text associated with each search result document. The search results may be provided to a user of client 210 via, for example, a graphical user interface. In some implementations, the location identifiers may include URLs associated with each of the search result documents. FIG. 6 illustrates search results 600, in accordance with one exemplary implementation, that include a list of URLs returned by server 220 as a result of a search query received from a user of a client 210.

Client 210 may receive location identifiers associated with documents selected from the received search results by a user of a client 210 (act 430)(FIG. 4B). A user may provide document location identifiers, from a set of search results provided to the user, to client 210 for the purpose of retrieving those documents from a remote data source connected to network 240. In one implementation consistent with principles of the invention, the location identifiers received by client 210 may include uniform resource locators (URLs), such as those used in the World-Wide Web (WWW). To provide the document location identifiers, for example, a user may select (e.g., "left-click" if using a "mouse" interface) a search result from the search results 600 of FIG. 6.

Client 210 may then send the location identifiers associated with documents selected from the received search results by the user to topicality/popularity server 230 (act 435). Client 210 may send the location identifiers via network 240 using existing messaging techniques. Server 230 may then use the sent location identifiers and search queries as described below with respect to FIGS. 7A and 7B.

Exemplary Server Processing

Figure 7A:
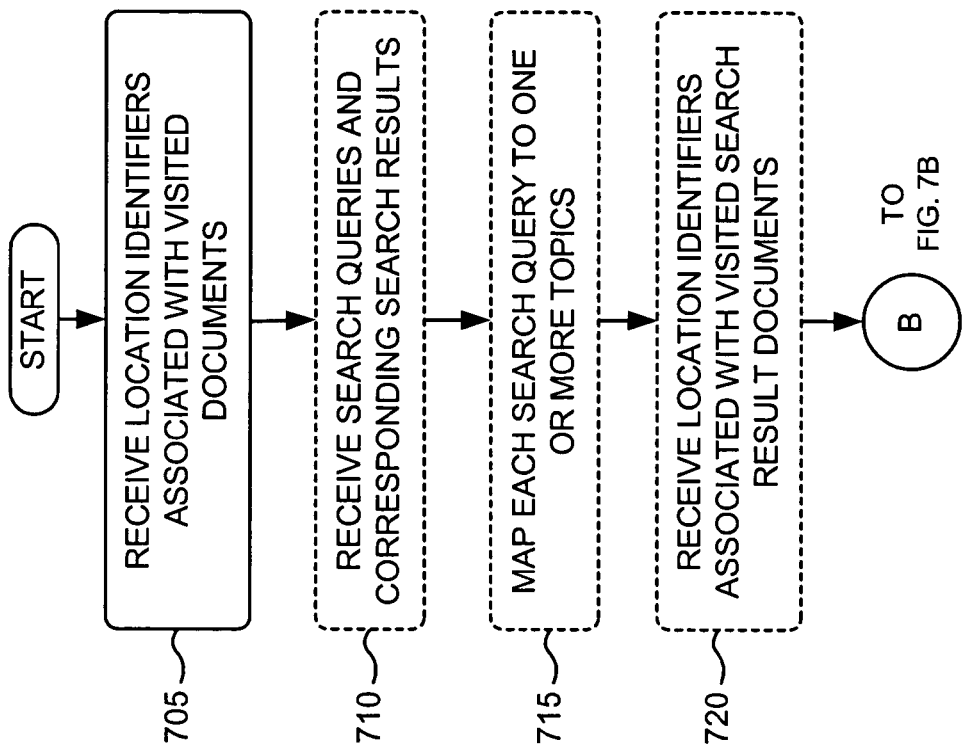

FIGS. 7A and 7B are flowcharts of exemplary server processing according to an implementation consistent with the principles of the invention. As one skilled in the art will appreciate, the processing exemplified by FIGS. 7A and 7B can be implemented in software and stored on a computer-readable memory, such as main memory 330, ROM 340 or storage device 350 of server 230. In other implementations, the processing exemplified by FIGS. 7A and 7B can be implemented in hardwired circuitry, such as combinational logic, within processing unit 320 of server 230.

Processing may begin with the receipt, at server 230, of location identifiers associated with documents visited by a user of a client 210 (act 705) (FIG. 7A). The location identifiers may have been used by the user to retrieve corresponding documents from a remote data source. In one implementation consistent with principles of the invention, the location identifiers received by server 230 may include uniform resource locators (URLs), such as those used in the World-Wide Web (WWW). Server 230 may receive the location identifiers from the client 210 using existing messaging techniques.

Optionally, one or more search queries, and corresponding search results, may be received, at server 230, from a client 210 (act 710). Each of the received search queries may, optionally, be mapped to one or more topics (act 715). Each search query may be mapped to one or more topics using various techniques. In one exemplary implementation, one or more portions of the textual content of the documents returned as a result of a search performed using the search query may be designated as a topic associated with the search query.

Figure 8:
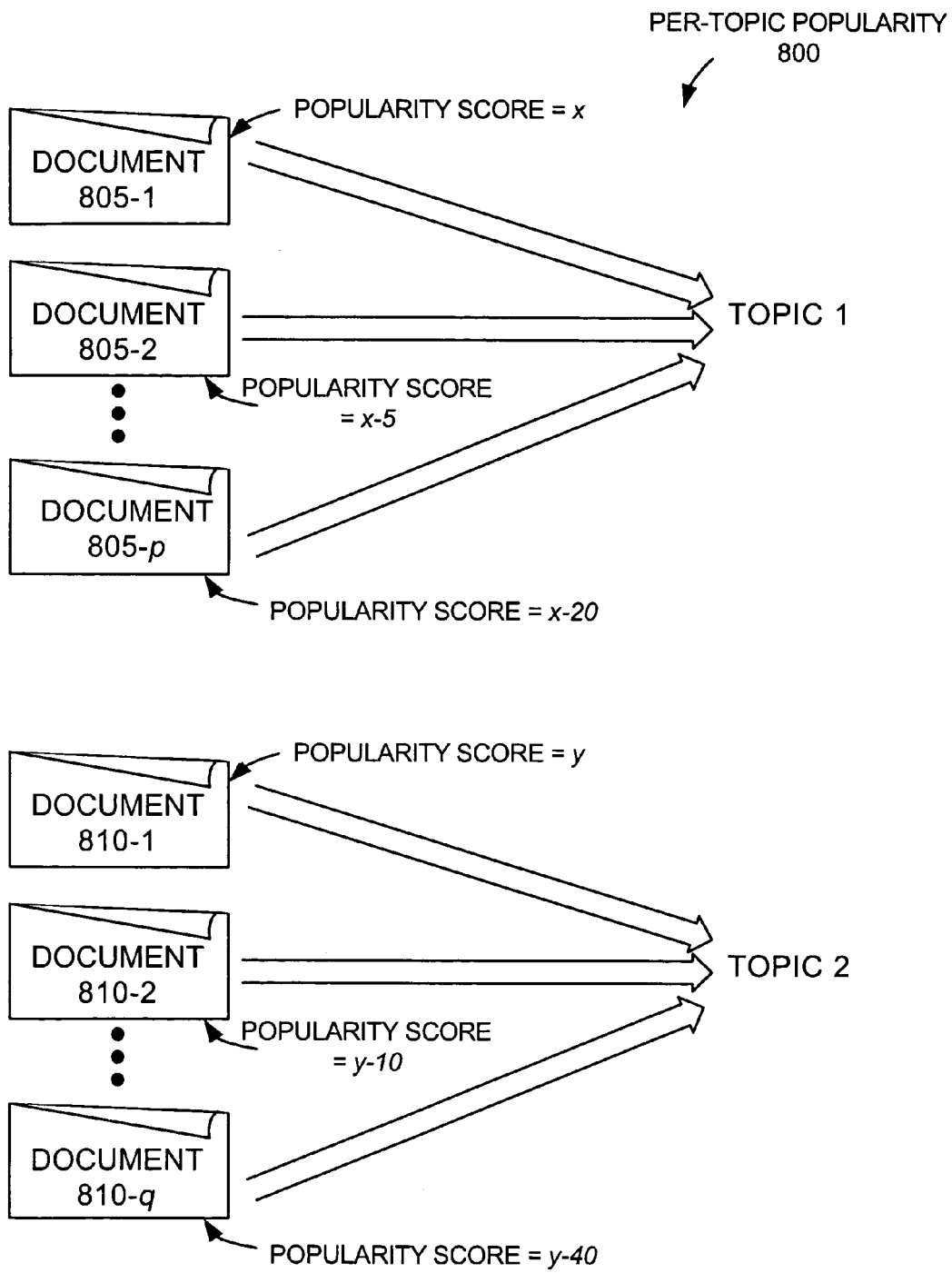
FIG. 8 is a diagram of documents correlated using topicality and popularity information according to an implementation consistent with the principles of the invention.

Location identifiers associated with visited search result documents may also, optionally, be received at server 230 from a client 210 (act 720). These location identifiers may correspond to documents selected by a user at client 210 from a list of search results provided by, for example, server 220. Each visited document may be mapped to one or more topics (act 725) (FIG. 7B). Each visited document may be mapped to one or more topics using various techniques. In one exemplary technique, a pre-defined directory of documents organized by category may be used to map a topic to each document. For example, if a document is listed in a travel directory of a search service (e.g., Google), then the document may be mapped to the topic of travel. In another exemplary implementation, the topic (or concept) mapping technique described in co-pending U.S. application Ser. No. 10/879,521, entitled "Systems and Methods for Inferring Concepts for Association with Content," the disclosure of which is incorporated by reference herein in its entirety, may be employed. FIG. 8 illustrates visited documents 805-1 through 805-$p$ mapped to "TOPIC 1" and visited documents 810-1 through 810-$q$ mapped to "TOPIC 2." In some implementations, related topics may be clustered into a larger topic to create hierarchical topics.

A popularity score associated with each visited document may be determined (act 730). In one implementation, the popularity score may be related to a number of "hits" or "visits" to the document. For example, a document E that has been visited 100 times by various users may be assigned a popularity score that is higher than a document F that has been visited only 10 times by various users. As shown in FIG. 8, each visited document 805-1 through 805-$p$ and 810-1 through 810-$q$ has been assigned a popularity score. In other implementations, "navigational" patterns to/from a document may be used in determining a popularity score for the document. For example, if it is determined that users visiting an initial document are often sent to a final document, then the initial document may likely be just "funneling" traffic to the final document, and the initial document may be of limited value to users. Additionally, if users visiting a first document only access a first document for a short period of time (e.g., less than 20 seconds) and then "jump" to a second document, then the second document may possibly be of limited value to users. Popularity scores may be appropriately associated with documents based on these types of user navigational patterns.

The popularity scores and one or more topics associated with each of the visited documents may be correlated to determine a per-topic popularity for each document (act 735). For example, all documents of a first set of documents mapped to a first topic may be ranked among one another according to their popularity scores, and all documents of a second set of documents mapped to a second topic may be ranked among one another according to their popularity scores. FIG. 8 illustrates the determination of per-topic popularity 800 among documents 805-1 through 805-$p$ and 810-1 through 810-$q$. As shown in FIG. 8, document 805-1, with a popularity score of x, is ranked above documents 805-1 and 805-$p$ that have popularity scores of x−5 and x−20, respectively. Also as shown in FIG. 8, document 810-1, with a popularity score of y, is ranked above documents 810-2 and 810-$q$ that have popularity scores of y−10 and y−40, respectively.

The determined per-topic popularity may then be utilized in a number of ways (act 740). For example, topic-specific quality scores may be assigned to documents based on the documents' popularity relative to other documents associated with a topic. The topic-specific quality scores may be used as a ranking signal. As another example, "personalized" document rankings may be provided to specific user groups based on that group's navigation patterns through various documents. As a further example, a document may be "boosted" within the results of a search using a topic associated with a corresponding search query. The popularity score of the document within the topic may be used as a ranking signal in raising, or lowering, the ranking of the document within the returned search results. As an additional example, documents returned as a result of an executed search query, where the search query has been mapped to one or more topics, may be ranked using the popularity of each of the documents with respect to the one or more topics to which the search query is mapped. In one implementation, the popularity scores of the search result documents may be combined to assign a query specific popularity score to the search result documents.

CONCLUSION

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while a series of acts have been described with regard to FIGS. 4A, 4B, 7A and 7B, the order of the acts may be modified in other implementations consistent with the principles of the invention. Additionally, while aspects of the invention has been described with respect to searching information stored in the world-wide web, one skilled in the art will recognize that the sorting and displaying of search results in multiple dimensions, consistent with the principles of the invention, may be employed in any other type of information searching system. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

Further, certain portions of the invention have been described as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    determining, by one or more server devices, a first popularity score for each document, of a plurality of documents;
    associating, by the one or more server devices, a first subset of documents, of the plurality of documents, with a first topic;
    associating, by the one or more server devices, a second subset of documents, of the plurality of documents, with a second topic that is different than the first topic;
    assigning, by the one or more server devices, to each document in the first subset, a second popularity score specific to the first topic, the second popularity score, assigned to each document in the first subset, being based on the first popularity score of the document in the first subset relative to the first popularity scores of other documents in the first subset, but not relative to the first popularity scores of the documents in the second subset;
    assigning, by the one or more server devices, to each document in the second subset, a third popularity score specific to the second topic, the third popularity score, assigned to each document in the second subset, being based on the first popularity score of the document in the second subset relative to the first popularity scores of other documents in the second subset, but not relative to the first popularity scores of the documents in the first subset;

receiving, by the one or more server devices, a search query;
identifying, by the one or more server devices, that the search query is associated with the first topic based on one or more search results being identified as relating to the first topic and associated with the search query;
determining, by the one or more server devices, that a particular document is associated with the first topic;
identifying, by the one or more server devices, a set of documents based on the search query, the set of documents including the particular document;
performing a first ranking, by the one or more server devices, for each document, in the set of documents, based on a relevance of each document, in the set of documents, to the search query;
performing a second ranking of the particular document, with respect to other documents in the set of documents, based on the second popularity score; and
providing for presentation, by the one or more server devices, the set of documents in an order that is based on the second ranking.

2. The method of claim 1, where the determining the first popularity score for each document, of the plurality of documents, comprises:
using at least one of user navigational patterns to each document, of the plurality of documents, or user navigational patterns from each document, of the plurality of documents, to determine the first popularity score.

3. The method of claim 1, where the associating the first subset of documents with the first topic and the associating the second subset of documents with the second topic comprises:
using a directory of documents organized by category to associate the documents in the first subset with the first topic and to associate the documents in the second subset with the second topic.

4. The method of claim 1, further comprising:
receiving location identifiers corresponding to the documents in the first subset and corresponding to the documents in the second subset.

5. The method of claim 4, further comprising:
retrieving the documents in the first subset and the second subset, using the received location identifiers, to associate the documents in the first subset with the first topic and to associate the documents in the second subset with the second topic.

6. The method of claim 1, where the determining the first popularity score for each document, of the plurality of documents, comprises:
associating the first popularity score with each document based on a number of times each document has been accessed.

7. The method of claim 1, where the determining the first popularity score for each document, of the plurality of documents, comprises:
associating the first popularity score with each document based on a number of times each document has been accessed by a user of a specific user group.

8. The method of claim 1, further comprising:
combining the second popularity scores and the third popularity scores across the first topic and the second topic to assign query-specific popularity score to the documents in the first subset and the second subset.

9. The method of claim 1, where the second popularity scores and the third popularity scores are different than the first popularity score determined for each document of the plurality of documents.

10. The method of claim 1, where the assigning, to each document in the first subset, the second popularity score specific to the first topic comprises:
ranking the documents in the first subset, associated with the first topic, relative to one another, but not relative to the documents in the second subset, based on their respective first popularity scores; and
assigning the second popularity score specific to the first topic to each document in the first subset based on the ranking of the documents in the first subset relative to one another.

11. The method of claim 1, where the assigning, to each document in the second subset, the third popularity score specific to the second topic comprises:
ranking the documents in the second subset, associated with the second topic, relative to one another, but not relative to the documents in the first subset, based on their respective first popularity scores; and
assigning the third popularity score specific to the second topic to each document in the second subset based on the ranking of the documents in the second subset relative to one another.

12. A non-transitory computer-readable memory device storing instructions executable by at least one processor, the non-transitory computer-readable memory device comprising:
one or more instructions to associate respective documents, of a plurality of documents, with one or more of at least two different topics;
one or more instructions to rank a first subset, of the plurality of documents associated with a first topic of the at least two different topics, relative to one another, but not relative to other documents not associated with the first topic, based on first popularity scores associated with the first subset;
one or more instructions to rank a second subset, of the plurality of documents associated with a second topic of the at least two different topics, relative to one another, but not relative to other documents not associated with the second topic, based on second popularity scores associated with the second subset;
one or more instructions to assign third popularity scores, specific to the first topic, to each document in the first subset based on the ranking of the documents in the first subset relative to one another;
one or more instructions to receive a search query;
one or more instructions to identify that the search query is associated with the first topic based on one or more search results being identified as relating to the first topic and associated with the search query;
one or more instructions to determine that a particular document is associated with the first topic;
one or more instructions to identify a set of documents based on the search query, the set of documents including the particular document;
one or more instructions to perform a first ranking for each document, in the set of documents, based on a relevance of each document, in the set of documents, to the search query;
one or more instructions to perform a second ranking of the particular document, with respect to other documents in the set of documents, based on the ranking of the particular document with respect to other documents in the first subset; and
one or more instructions to provide, for presentation, the set of documents in an order that is based on the second ranking.

13. The non-transitory computer-readable memory device of claim 12, where a first document in the first subset is also in the second subset.

14. The non-transitory computer-readable memory device of claim 13, where the first document is separately ranked among the first subset of documents based on the first popularity score, and among the second subset of documents based on the second popularity score.

15. A method comprising:
- determining, by one or more server devices, popularity scores associated with a plurality of documents;
- associating, by the one or more server devices, a first subset of the plurality of documents with a first topic;
- assigning, by the one or more server devices, a first topic-specific popularity score to each document in the first subset based on a ranking of the first subset of the plurality of documents relative to one another, but not relative to other documents of the plurality of documents not associated with the first topic, using respective ones of the popularity scores associated with the documents in the first subset, the first topic-specific popularity scores being different than the popularity scores;
- identifying, by the one or more server devices, that a received search query is associated with the first topic based on one or more search results being identified as relating to the first topic and associated with the received search query;
- determining, by the one or more server devices, that a particular document is associated with the first topic;
- identifying, by the one or more server devices, a set of documents based on the received search query, the set of documents including the particular document;
- performing a first ranking, by the one or more server devices, of each document, in the set of documents, based on a relevance of each document, in the set of documents, to the received search query;
- performing a second ranking of the particular document, with respect to other documents in the set of documents, based on the first topic-specific popularity score; and
- providing for presentation, by the one or more server devices, the set of documents in an order that is based on the second ranking.

16. The method of claim 15, where the popularity scores, associated with the plurality of documents, are each based on a number of visits associated with a respective document with which each popularity score is associated.

17. A system comprising:
one or more devices to:
- determine popularity scores associated with a plurality of documents;
- associate a first subset of the plurality of documents with a first topic;
- associate a second subset of the plurality of documents with a second topic that is different than the first topic;
- assign a first topic-specific popularity score to each document in the first subset based on a ranking of the documents in the first subset relative to one another, but not relative to other documents, of the plurality of documents, not associated with the first topic, using respective ones of the popularity scores associated with the documents in the first subset, the first topic-specific popularity scores being different than the popularity scores;
- assign a second topic-specific popularity score to each document in the second subset based on a ranking of the documents in the second subset relative to one another, but not relative to other documents, of the plurality of documents, not associated with the second topic, using respective ones of the popularity scores associated with the documents in the second subset, the second topic-specific popularity scores being different than the popularity scores;
- identify that a received search query is associated with the first topic based on one or more search results being identified as relating to the first topic and associated with the received search query;
- determine that a particular document is associated with the first topic;
- identify a set of documents based on the received search query, the set of documents including the particular document;
- perform a first ranking for each document, in the set of documents, based on a relevance of each document, in the set of documents, to the received search query;
- perform a second ranking of the particular document, with respect to other documents in the set of documents, based on the first topic-specific popularity score; and
- provide, for presentation, the set of documents in an order that is based on the second ranking.

18. A system comprising:
one or more memory devices to store instructions; and
one or more processors to execute the instructions, to:
- determine a first popularity score for each document of a plurality of documents;
- associate a first subset of documents, of the plurality of documents, with a first topic;
- assign, to each document in the first subset but not to documents that are not in the first subset, a second popularity score specific to the first topic, the second popularity score, assigned to each document in the first subset, being based on the first popularity score of the document in the first subset relative to the first popularity scores of other documents in the first subset;
- identify that a received search query is associated with the first topic based on one or more search results being identified as relating to the first topic and associated with the received search query;
- determine that a particular document is associated with the first topic;
- identify a set of documents based on the received search query, the set of documents including the particular document;
- perform a first ranking for each document, in the set of documents, based on a relevance of each document, in the set of documents, to the received search query;
- perform a second ranking of the particular document, with respect to other documents in the set of documents, based on the second popularity score; and
- provide, for presentation, the set of documents in an order that is based on the second ranking.

19. The system of claim 18, where when determining the first popularity score for each document of the plurality of documents, the one or more processors are to:
use at least one of user navigational patterns to each document, of the plurality of documents, or user navigational patterns from each document, of the plurality of documents, to determine the first popularity score.

20. The system of claim 18, where when associating the documents in the first subset with the first topic, the one more processors are to:

use a directory of documents organized by category to associate the documents in the first subset with the first topic.

21. A non-transitory computer-readable memory device storing instructions executable by at least one processor, the non-transitory computer-readable memory device comprising:

one or more instructions to determine a first popularity score for each document, of a plurality of documents;

one or more instructions to associate a first subset of documents, of the plurality of documents, with a first topic;

one or more instructions to assign, to each document in the first subset but not to documents that are not in the first subset, a second popularity score specific to the first topic, the second popularity score, assigned to each document in the first subset, being based on the first popularity score of the document in the first subset relative to the first popularity scores of other documents in the first subset;

one or more instructions to identify that a received search query is associated with the first topic based on one or more search results being identified as relating to the first topic and associated with the received search query;

one or more instructions to identify a set of documents based on the received search query, the set of documents including a particular document associated with the first topic;

one or more instructions to perform a first ranking for each document, in the set of documents, based on a relevance of each document, in the set of documents, to the received search query;

one or more instructions to perform a second ranking of the particular document, with respect to other documents in the set of documents, based on the second popularity score; and one or more instructions to provide, for presentation, the set of documents in an order that is based on the second ranking.

22. The non-transitory computer-readable memory device of claim 21, where the one or more instructions to determine the first popularity score for each document, of the plurality of documents, include:

one or more instructions to use at least one of user navigational patterns to each document, of the plurality of documents, or user navigational patterns from each document, of the plurality of documents, to determine the first popularity score.

23. The non-transitory computer-readable memory device of claim 21, where the one or more instructions to associate the documents in the first subset with the first topic include:

one or more instructions to use a directory of documents organized by category to associate the documents in the first subset with the first topic.

* * * * *